United States Patent [19]

Burcz et al.

[11] 4,090,417

[45] May 23, 1978

[54] CONTROL SYSTEM FOR AN AUTOMATIC TRANSMISSION WITH A HYDROKINETIC TORQUE CONVERTER AND AN INTEGRAL LOCKUP CLUTCH

[75] Inventors: Lawrence D. Burcz; Douglas A. Whitney, both of Livonia, Mich.

[73] Assignee: Ford Motor Company, Dearborn, Mich.

[21] Appl. No.: 647,037

[22] Filed: Jan. 7, 1976

[51] Int. Cl.² .................. B60K 41/22; F16H 45/02; F16H 47/00; F16D 33/10

[52] U.S. Cl. ................................ 74/864; 74/732; 74/733; 192/3.3

[58] Field of Search ............. 74/732, 731, 733, 864, 74/863, 867, 868, 869; 192/3.29, 3.3, 3.57

[56] References Cited

U.S. PATENT DOCUMENTS

| | | |
|---|---|---|
| 2,793,726 | 5/1957 | Jandasek .................... 74/732 X |
| 3,025,723 | 3/1962 | Miller ........................... 74/732 |
| 3,213,983 | 10/1965 | Smirl et al. ................... 192/3.3 |
| 3,252,352 | 5/1966 | General et al. .............. 192/3.29 X |
| 3,541,893 | 11/1970 | Dyke et al. .................. 192/3.3 X |
| 3,730,315 | 5/1973 | Annis et al. .................. 74/733 X |

Primary Examiner—Samuel Scott
Assistant Examiner—Carl F. Pietruszka
Attorney, Agent, or Firm—Donald J. Harrington; Keith L. Zerschling

[57] ABSTRACT

A multiple ratio power transmission mechanism having a gear system and a hydrokinetic unit with a lockup clutch that responds to pressure in the hydrokinetic unit to establish a mechanical torque delivery path around the hydrokinetic unit and a valve system for engaging and disengaging the clutch and for controlling clutch capacity by modulating the clutch pressure and by controlling the direction of fluid flow through the hydrokinetic unit.

14 Claims, 7 Drawing Figures

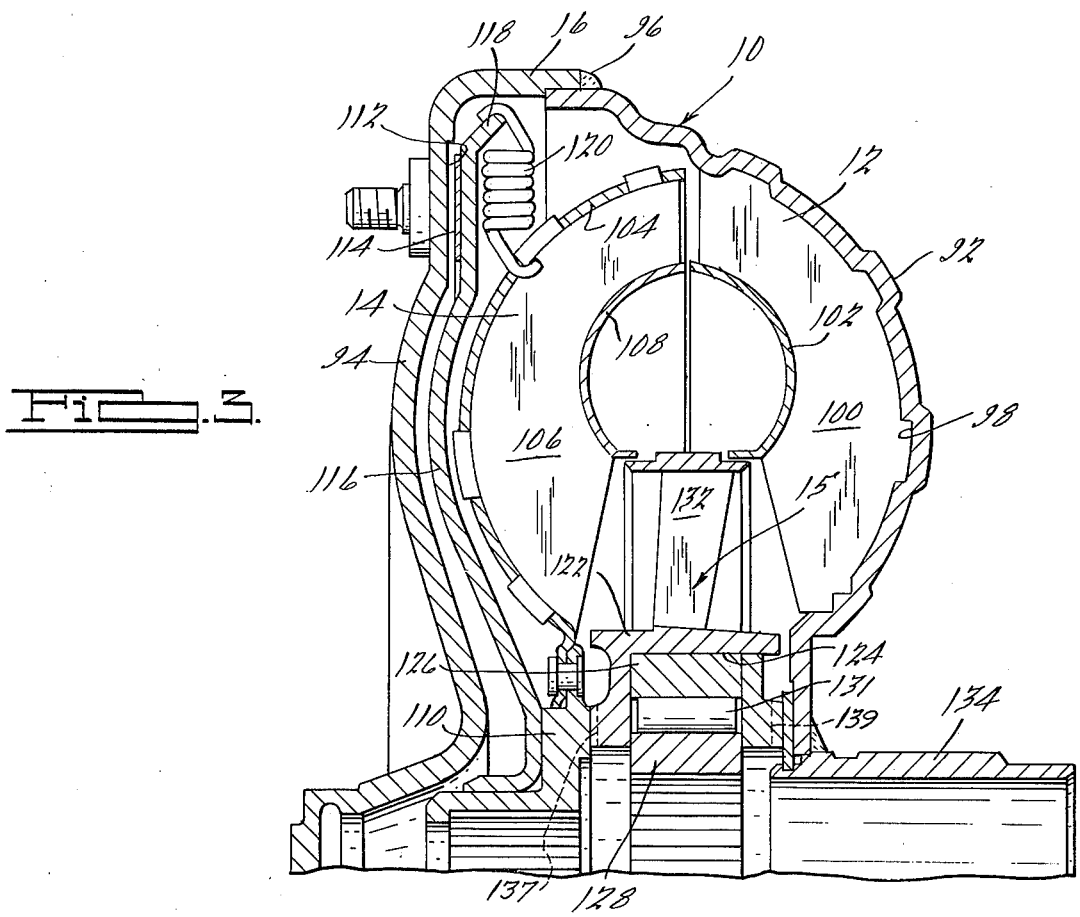
Lock-Up Capacity Modulator
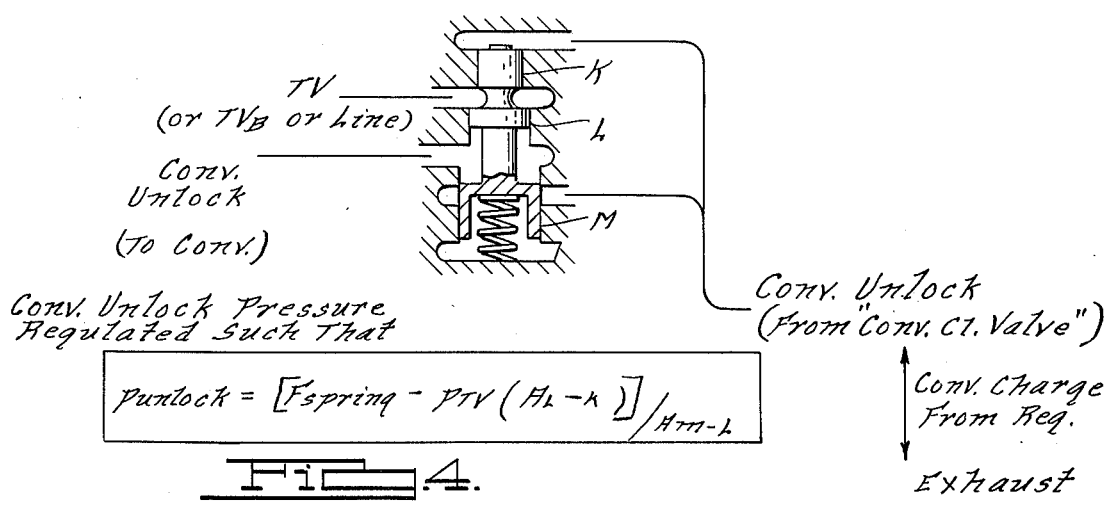
$$P_{unlock} = [F_{spring} - P_{TV}(A_L - K)]/A_{m-L}$$

C6 Lock-Up
LP.-62514 Thru Rev. D 3-10-75
3-L Modulator Valve

CONTROL SYSTEM FOR AN AUTOMATIC TRANSMISSION WITH A HYDROKINETIC TORQUE CONVERTER AND AN INTEGRAL LOCKUP CLUTCH

GENERAL DESCRIPTION OF THE INVENTION

The improvements of my invention are adapted to be used especially in a hydrokinetic torque converter transmission for use in an automotive vehicle driveline. Automatic transmissions for automotive vehicles usually include multiple ratio planetary gear systems and a hydrokinetic bladed torque converter, the latter serving as a hydrokinetic torque delivery path between the crankshaft of an internal combustion engine and the torque input elements of the gear system. The hydrokinetic torque converter acts as an infinitely variable torque multiplication device during vehicle acceleration and as a fluid coupling during high speed ratio operation. The gear system is controlled so that automatic ratio changes occur as the vehicle accelerates from a standing start until road load, steady-state operation is achieved. Usually three ratios are used, although transmissions often include a greater number of ratios if the engine size is relatively small. The highest ratios is usually a direct-drive 1:1 ratio. A substantial part of the total operating time during cruising occurs with the transmission in the highest ratio. Thus, the hydrokinetic loss in the converter always is present during cruising.

The improvements of our invention are adapted to be used with a mechanical friction clutch located within the hydrokinetic torque converter shell for establishing a mechanical torque delivery path that bypasses the hydrokinetic torque delivery path through the converter during cruising operation. This eliminates the hydrokinetic losses in the driveline and improves the operating efficiency of the transmission system. Examples of clutches of this type are described in U.S. Pat. Nos. 3,252,352; 3,239,037; 3,275,108; 3,541,893; 3,491,617; 3,497,043; 3,470,693; 3,463,033; 3,230,716; 3,209,540; 3,205,622 and 3,188,887.

The friction clutch includes a clutch member that cooperates with the converter shell to define a torus fluid flow path for the converter fluid that is circulated through the converter during coupling operation of the converter as well as during operation of the converter in the torque conversion range. By controlling the direction of the flow through the converter, the friction clutch may be activated and deactivated.

The improvements of our invention comprise an automatic control valve system that appropriately controls the direction of fluid flow through the converter and the associated friction clutch member so that the mechanical bypass torque flow path may be activated and deactivated at the appropriate time. Provision is made also for modulating the fluid pressure made available to the converter for actuating the clutch so that the clutch capacity is sensitive to the torque requirements for the driveline. Our improved valve system also makes provision for preventing automatic downshifts from the direct-drive range to the intermediate ratio while the converter is in the locked-up condition. The valve system assures that the lock-up clutch will be disengaged prior to a downshift from the direct-drive ratio to the intermediate ratio during acceleration. Thus, fluid coupling operation and torque converter operation are available for acceleration purposes and for effecting a smooth downshift. Provision is made also in the control system of our invention for preventing clutch engagement whenever the transmission system is conditioned for underdrive ratio operation. A lock-up condition can be achieved only after the final upshift occurs.

Following an upshift to the lock-up condition, a downshift may be achieved as the engine torque demand is increased. The amount of torque demand is determined by the magnitude of a so-called throttle pressure that is under the control of the vehicle operator. Throttle pressure is an indicator of engine intake manifold pressure as is the case with many automatic control valve systems presently used in the automotive industry. The valve system of our invention, however, makes it necessary to use a higher torque sensitive throttle valve pressure to achieve a downshift from a lock-up condition to the normal direct-drive ratio than the corresponding throttle valve pressure that is present when the upshift from the normal direct-drive ratio to the lock-up ratio is achieved.

BRIEF DESCRIPTION OF THE FIGURES OF THE DRAWINGS

FIG. 3 is a cross-sectional view of a hydrokinetic torque converter with a lock-up clutch mechanism for use in a transmission system of FIG. 1;

FIG. 4 is a detail view of a lock-up clutch capacity modulator valve for use in the valve system of FIGS. 2A and 2B;

GENERAL DESCRIPTION OF THE INVENTION

Figure 1:
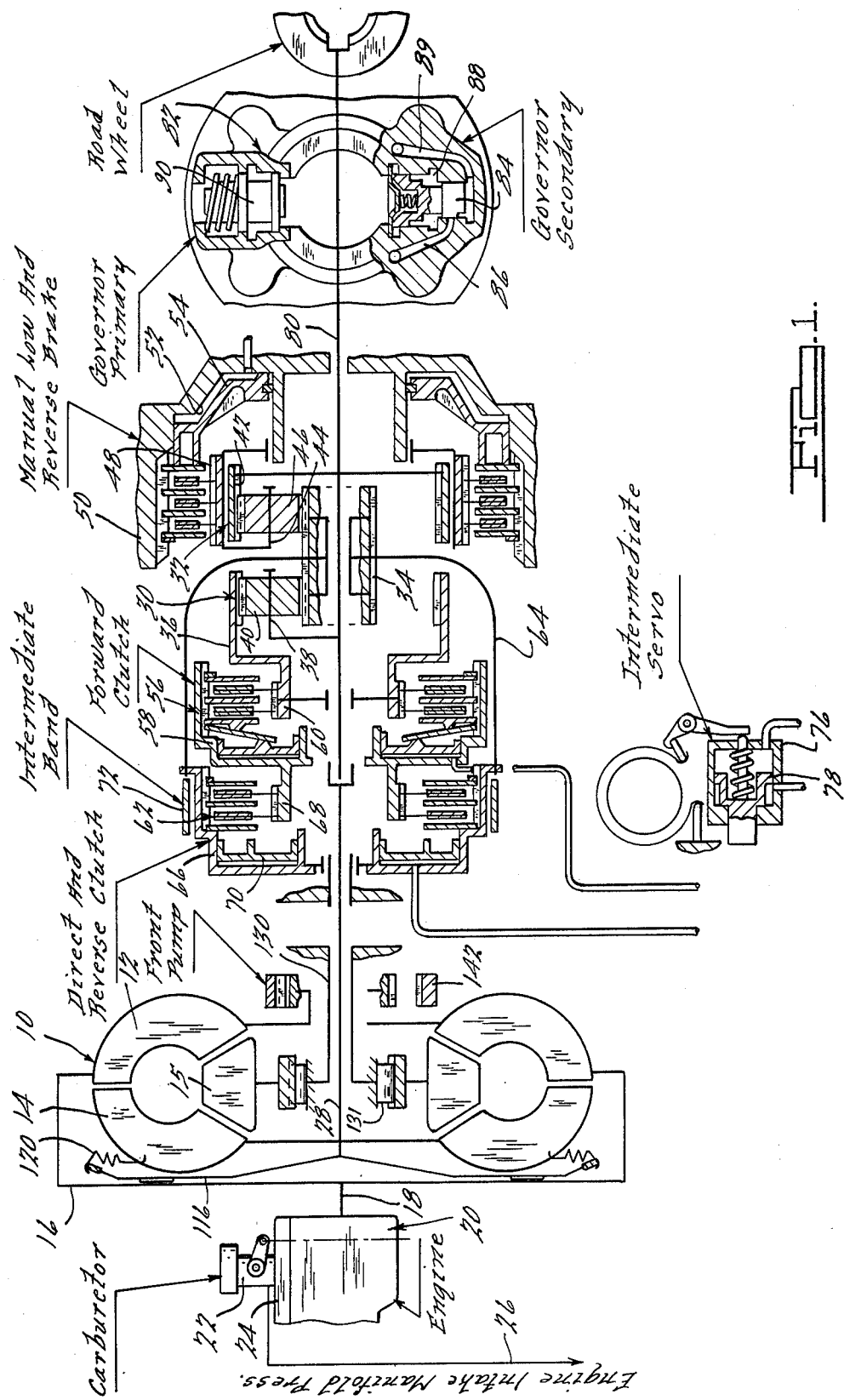
FIG. 1 is a cross-sectional assembly view of an automatic transmission for a vehicle driveline capable of embodying the improvements of my invention.

In FIG. 1 reference numeral 10 designates a hydrokinetic torque converter, which includes a bladed impeller 12, a bladed turbine 14 and a bladed stator 15, arranged in toroidal fluid flow relationship. This converter will be described more particularly with reference to FIG. 3. The impeller has an impeller shell 16 which forms an enclosure for each of the bladed members. The shell 16 is connected drivably to the crankshaft 18 of an internal combustion engine 20. The engine 20 includes a driver-controlled carburetor 22 which establishes a controlled flow of air-fuel mixture to an intake manifold 24. The intake manifold passage 26 extends from the manifold on the downstream side of the engine carburetor throttle to the transmission throttle valve that will be described with reference to FIG. 2.

The turbine 14 of the hydrokinetic torque converter 10 is connected drivably to a turbine shaft 28 which serves as a torque input shaft for the gear system, the latter including two simple planetary gear units 30 and 32. A sun gear 34 for the gear system is common to each of the gear units 30 and 32. Gear unit 30 includes, in addition to the sun gear 34, ring gear 36, carrier 38 and planet pinions 40 journalled on carrier 38. Gear unit 32 includes, in addition to the sun gear 34, ring gear 42, carrier 44 and planet pinions 46 journalled on the carrier 44. Pinions 40 mesh with ring gear 36 and sun gear 34, and pinions 46 mesh with ring gear 42 and sun gear 34. A friction disc brake member 48 connected to the carrier 44 cooperates with friction brake discs carried by stationary housing 50. An annular cylinder 52 formed by the housing 50 receives an annular piston 54, which cooperates with the cylinder to define a pressure chamber. When the pressure chamber is pressurized, the brake discs of the carrier are energized thereby anchoring the carrier to form a reaction point during manual low operation and during reverse drive operation.

Forward clutch 56 is adapted to connect drivably the turbine shaft 28 and the ring gear 36. It comprises a clutch member that defines an annular cylinder 58 and which carries clutch discs that register frictionally with clutch disc carried by clutch member 60, the latter being connected to the ring gear 36. An annular piston is situated in the annular cylinder 58 that defines with the cylinder a pressure chamber which when pressurized causes the clutch disc to engage.

Direct-and-reverse clutch 62 establishes a driving connection between the turbine shaft 28 and a drive shell 64, which in turn is connected directly to the sun gear 34. Clutch 62 includes a clutch member that defines an annular cylinder 66. Clutch discs are carried by the cylinder 66 and by a cooperating clutch member 68 carried by the annular cylinder 58. An annular piston 70 is situated in the annular cylinder 66 and cooperates with it to define a pressure chamber which when pressurized causes the clutch 62 to be frictionally engaged. Annular cylinder 66 defines also a brake drum about which is positioned brake band 72. Brake band 72 is engaged during operation in the intermediate underdrive ratio and it causes the sun gear 34 to be anchored so that it may serve as a reaction point. Brake band 72 is applied and released by a fluid pressure operated servo which includes a cylinder 76 and a cooperating piston 78.

The intermediate servo has two working chambers on either side of the piston 78, and the piston is connected mechanically to the operating end of the brake band. If both pressure chambers on either side of the piston 78 are pressurized, the piston is stroked to a brake releasing position. When the left-hand pressure chamber is pressurized and the right-hand pressure chamber is exhausted, the piston is stroked to a brake operating position. When brake band 72 is applied and forward clutch 56 is applied the transmission system is conditioned for intermediate underdrive operation. Forward clutch 56 is applied during operation in each forward drive ratio.

Reverse drive operation is obtained by disengaging the forward clutch 56 and engaging the direct-and-reverse clutch 62. At the same time the manual low-and-reverse brake is engaged, thereby causing the carrier 44 to serve as a reaction point. Turbine torque then is delivered from shaft 28 through clutch 62 to the sun gear 34. With the sun gear serving as a torque input element and the carrier 44 anchored, the ring gear 42 is driven in a reverse direction. Ring gear 42 is connected directly to power output shaft 80.

A fluid pressure governor having a primary governor stage and a secondary governor stage is connected drivably to the power output shaft 80 as shown at 82. Governor 82 has a two stage pressure characteristic. The governor signal is produced by a secondary governor valve 84 which modulates the pressure in governor feed passage 86 to produce a resultant speed signal pressure in port 88. The primary governor 90 interrupts the modulating action of the secondary governor during operation in low speeds by blocking passage 89, which extends to the radially outward end of valve 84. At high speeds, valve 90 exhausts passage 86 which permits the speed signal to develop. The speed signal is used together with a vacuum signal from passage 26 to establish automatic control functions in the circuit that will be described with reference to FIGS. 2A and 2B.

The converter 10, which is shown schematically in FIG. 1, is shown in cross-section form in FIG. 3. The impeller shell 16, as shown in FIG. 3, includes two housing shell parts which are separately identified by reference characters 92 and 94. These parts are welded together by a seam weld 96. Shell part 92 includes recesses 98 which receive tabs formed on the outer margin of the impeller blades 100. The inner margin of the blades 100 are secured to an inner shroud 102.

An outer turbine shroud 104 has secured thereto turbine blades 106. An inner turbine shroud 108 is secured to the inner margin of the turbine blades 106. Shroud 104 is secured to turbine hub 110 which in turn is splined to the turbine shaft 28.

An annular friction surface 112 is formed on the interior of the shell part 94. Friction surface 114 formed on clutch member 116 is positioned directly adjacent friction surface 112. Clutch member 116 is in the form of a diaphragm that is piloted on the turbine hub 110. The member 116 extends through the annular space situated between the turbine shroud 104 and the shell part 94. The outer periphery 118 of the clutch member 116 is connected drivably to the shroud 104 through a plurality of radially disposed damper springs 120.

Reactor 15 includes a hub 122 which has a central opening 124 which receives an overrunning clutch outer race 126. Overrunning clutch inner race 128 is splined to stator sleeve shaft 130 which is illustrated schematically in FIG. 1. The stator sleeve shaft is connected to or forms a part of the housing of the transmission. Overrunning clutch rollers 131 are situated between the races 126 and 128 to brake the stator 15 against rotation in a direction opposite to the direction of rotation of the impeller but which will permit freewheeling motion of the stator in the same direction as the direction of rotation of the impeller. The stator 15 includes stator blades 132 disposed between the toroidal fluid flow exit section of the turbine blades 106 and the toroidal fluid flow entrance section for the impeller blades 100.

Impeller 12 includes an impeller hub 134 which is a sleeve shaft that is journalled within a stationary housing portion of the transmission mechanism.

Figure 2A:
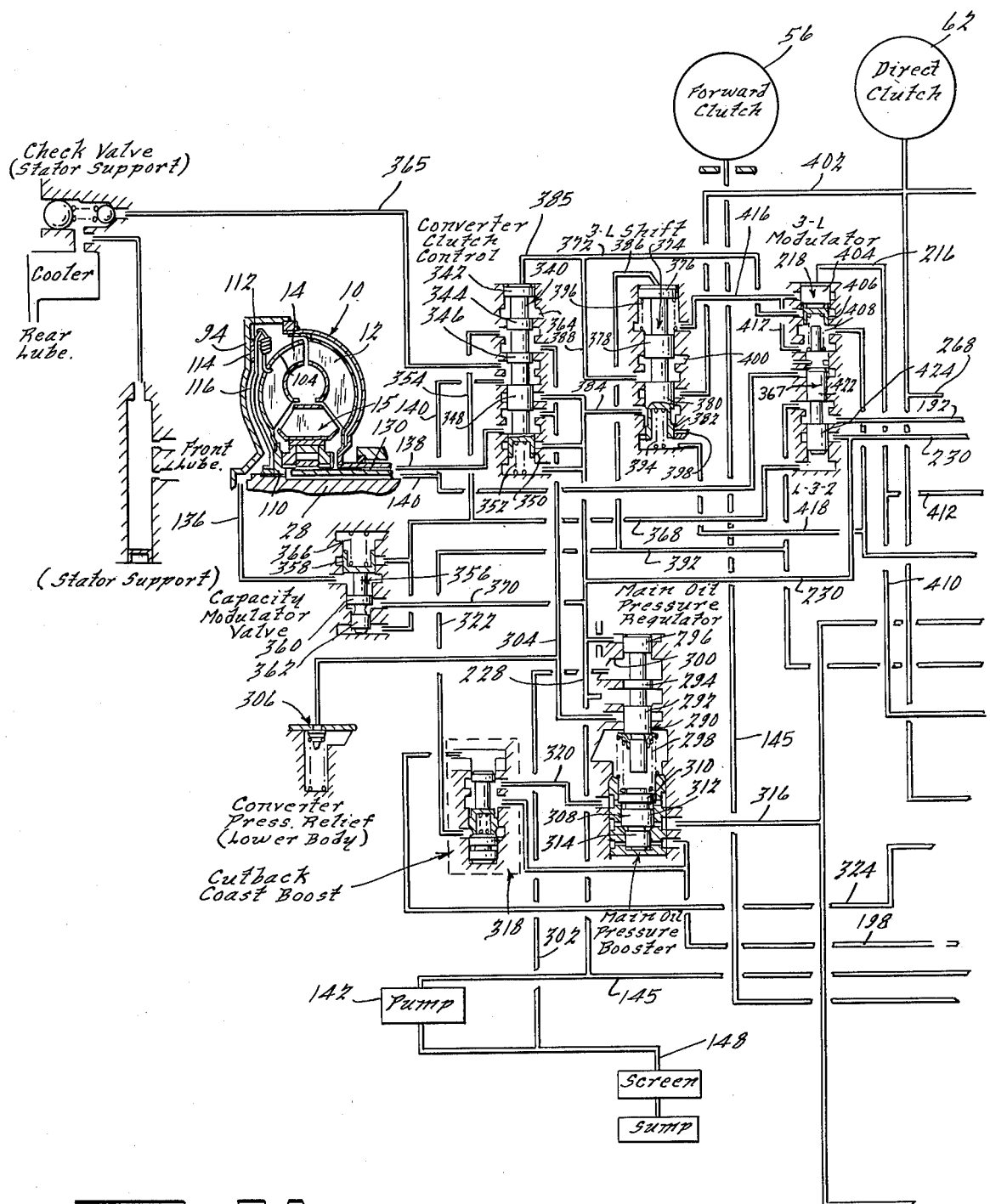
FIG. 2A and 2B show a control valve system for controlling ratio changes in the transmission system of FIG. 1.
Figure 2B:
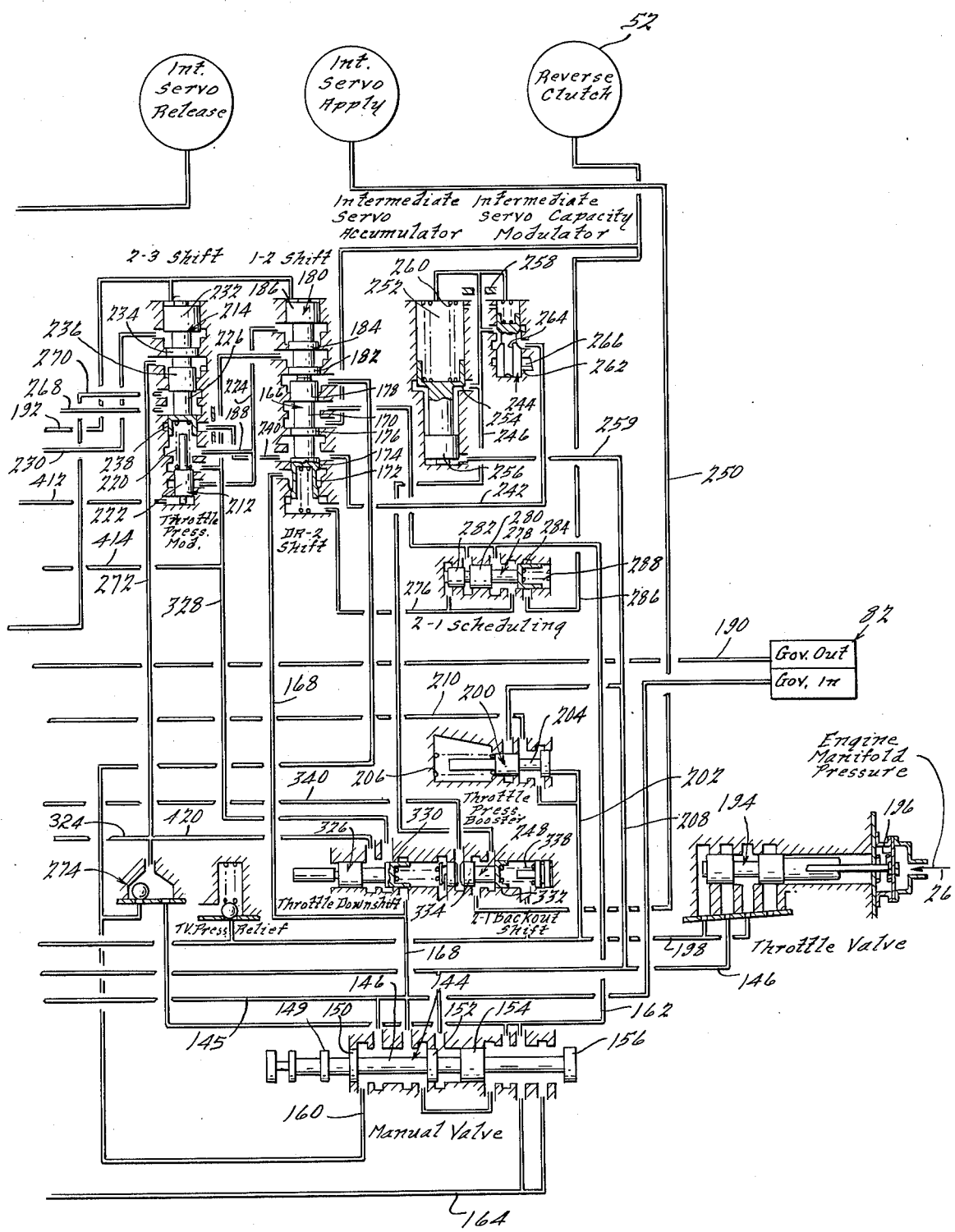

The fluid flow path through the converter can be understood by referring to the circuit diagram of FIGS. 2A and 2B. There are three fluid flow circuits through the converter 10 including two converter pressure supply passages 136 and 138 and a converter fluid flow return passage 140. Openings 137 and 139 in the stator thrust members form radial flow passages between the interior of the converter torus circuit and passages 140 and 138, respectively. When fluid is supplied to the converter through passage 136, the fluid flows radially outwardly through the annular space between the impeller shell part 94 and the clutch member 116 and across the friction surfaces 112 and 114 to the interior of the torus circuit for the converter. Fluid is returned from the torus circuit of the converter in a radially inward direction past the space 137 between the reactor hub and the turbine hub 110 and then through the annular, axially disposed flow passage 139 located between turbine shaft 28 and stator sleeve shaft 130. When converter fluid flows through passages 136 and 138 and through the converter to the return passage 140, the friction surfaces 112 and 114 are disengaged and the converter is capable of functioning in its usual fashion either as a torque converter or as a fluid coupling. On the other hand, when fluid enters the converter from passages 138 and 140, the circuit pressure within the hydrokinetic torque converter causes the clutch member 116 to frictionally engage the impeller shell at the friction surfaces 112 and 114. This establishes a mechanical connection between the turbine and the impeller through the engaged friction surfaces. The engaging force for the converter clutch is dependent upon the pressure differential across the clutch member 116. For any given circuit pressure for the converter, the clutch capacity can be controlled by modulating the pressure that exists in the annular space between the impeller shell 94 and the clutch member 116 following clutch engagement.

The source of pressure for the circuit of FIG. 2 is pump 142, as seen from the schematic sketch of FIG. 1, the pump 142 is driven by the impeller and thus rotates with the crankshaft of the engine. Pressure is distributed from the pump to a driver operated manual valve 144 through passage 145. The intake side of the pump is connected to a transmission sump located at the base of the transmission housing, the intake passage being shown at 148. The manual valve 144 comprises a valve spool 146 having five axially spaced valve lands 149, 150, 152, 154 and 156. The valve spool may be shifted to any of several operating positions by the vehicle operator in order to control distribution of pressure to passages 145, 160, 162 and 164. Communication is established from supply pressure passage 145 through the valve to each of these passages. Passage 145 is pressurized during operation of the transmission mechanism in any one of the forward driving ratios. Passage 160 is pressurized whenever the manual valve is shifted to cause continuous operation in intermediate or second speed ratios. Passage 162 is pressurized whenever the manual valve is shifted to the reverse drive position or to the position corresponding to low speed ratio or manual low operation. Passage 164 is pressurized whenever the transmission is conditioned for reverse drive operation.

Passage 145 extends directly to the forward clutch 56 so that the forward clutch is energized during operation in each of the forward driving ratios. Pressure is distributed also to 1-2 shift valve 166 from front clutch pressure passage 145 through passage 168. Shift valve 166 includes a valve element 170 which is formed with valve lands 172, 174, 176 and 178. It includes also a valve element 180 that engages the upper end of valve element 170. Valve element 180 includes spaced valve lands 182, 184 and 186. The space between the valve elements 180 and 170 communicates with passage 160 which is pressurized during operation in the second drive ratio position of the manual valve. Valve element 170 is referred to in the schematic diagram of FIG. 2A as the DR-2 shift valve since it is urged in a downward direction by the pressure in passage 160 when the manual valve is in the number second drive range position thereby preventing a ratio change from the intermediate ratio to the low speed ratio.

Governor pressure from the secondary governor valve portion of the governor 82 is distributed to the upper end of land 186 through passage 190, through the L-3-2 valve and through passage 192. A torque signal for the control circuit is obtained by throttle valve 194, which comprises a movable, multiple land valve spool connected to diaphragm 196, the right-hand side of which is subjected to the engine intake manifold pressure in passage 26. Control pressure is supplied to the valve 194 from passage 146. The valve modulates the pressure in passage 146 to produce a throttle pressure signal in passage 198 that is dependent upon the manifold pressure on the right-hand side of the diaphragm 196. This throttle pressure, which is called a primary throttle valve pressure, is distributed to the throttle pressure booster valve 200 through passage 202. Booster valve 200 includes a double land valve spool 204 located in a valve chamber and it is spring loaded in a right-hand direction as viewed in FIG. 2B by valve spring 206. Control pressure is distributed to the valve 200 from passage 146 through passage 208. Valve 200 modulates the pressure in passage 202 to produce a boosted or secondary throttle valve pressure in passage 210.

Whenever the magnitude of the primary throttle valve pressure exceeds that value that produces the force necessary to overcome the force of spring 206, secondary throttle valve pressure is distributed through passages 210, 410 and 412 to throttle pressure modulator valve 212 located below the 2-3 shift valve 214. Secondary throttle valve pressure is distributed also from passages 210 and 410 to passage 216, which extends to the upper end of the 3-L modulator valve 218.

The throttle pressure modulator valve 212 includes a valve spring 220. Pressure distributed to the lower end of the throttle pressure modulator valve element 222 is reduced as it is distributed to passage 224 extending to the differential area on 1-2 shift valve 180 which is defined by the differential diameter valve lands 184 and 186. This tends to urge the 1-2 shift valve 180 in a downshift position which corresponds to the uppermost position shown in FIG. 2B. Feedback pressure passage 188 distributes the reduced pressure to the upper end of the valve element 222 causing the latter to modulate. This reduced pressure is also applied to the lower end of the 2-3 shift valve element 226 to supplement the force of valve spring 220 acting thereon.

Control pressure from the outlet side of the pump 142 is distributed from passage 145 through passage 228 and through passage 230 to a differential area on the 2-3 shift valve defined by spaced valve lands 232 and 234. The 2-3 shift valve 214 includes also smaller diameter valve lands 236 and 238. The modulated secondary throttle pressure forces acting on each of the shift valves 180 and 214 urge them in an upward direction against the opposing force of the governor pressure distributed to the upper ends of lands 186 and 232 through passage 192.

Passage 168, when the 1-2 shift valve is moved downwardly to its upshift position, is brought into communication with the passage 240 which supplies control pressure from pump 142 to the 2-3 shift valve. At the same time passage 168 is brought into communication with passage 242 which extends through intermediate servo capacity modulator 244 to passage 246. The 2-1 backout shift valve 248 communicates with passage 246 and establishes therethrough communication with passage 250, which extends directly to the apply side of the intermediate servo. The feel of the engagement and release of the intermediate servo is controlled by the intermediate servo accumulator 252 and the intermediate servo capacity modulator 244. As pressure builds up in passage 246 following movement of the 1-2 shift valve to the upshift position, pressure is distributed to the differential area of the accumulator lands 254 and 256. Control pressure is distributed to the lower end of the land 256 through passage 259. When a shift to the intermediate ratio occurs under torque, the accumulator valve lands are in an upward position. As pressure is bled from passage 246 across control orifice 258 to the upper side of the land 254, an increase in pressure is developed that supplements the force of the accumulator valve springs 260 so that the accumulator is stroked thereby providing a controlled engagement of the servo.

As soon as the DR-2 shift valve moves downward, line pressure from passage 168 is distributed to passage 242 and through the intermediate servo capacity modulator 244 to the line 246, the latter extending through the 2-1 backout shift valve 248 to the apply side of the intermediate servo. Following movement of the DR-2 shift valve in response to an increase in governor pressure in passage 192, a pressure buildup occurs in passage 246 on the downstream side of the intermediate servo capacity modulator valve and on the upstream side of the orifice 258. A delayed pressure buildup occurs on the downstream side of the orifice 258, the rate of pressure buildup being determined by the characteristics of the intermediate servo accumulator. The ultimate intermediate servo apply pressure is determined by the modulating action of the valve 244. Pressure from passage 242 is distributed to the lower end of valve land 262 through internal valve passage 264. Land 262 controls the effective size of exhaust port 266. Whenever pressure is made available to passage 242, the same pressure is made available to passage 240 which is the supply passage for the 2-3 shift valve. Passage 268 is the feed passage for the direct drive clutch and the release side of the intermediate servo. When the 2-3 shift valve is in the position shown in FIG. 2, passage 268 is exhausted through reverse servo feed passage 270, which communicates with passage 164 and with the exhaust through the manual valve ports.

Secondary throttle pressure is distributed to the throttle pressure modulator valve 212 through passage 210. That pressure is modulated and the output of the throttle pressure modulator valve acts on the lower end of land 238 to complement the action of spring 220. When the magnitude of the governor pressure acting on the land 232 overcomes the combined force of the spring 220 and the modulated secondary throttle pressure, the 2-3 shift valve is moved in a downward direction thereby blocking exhausted passage 270 and pressurizing passage 268. Passage 230 distributes line pressure to the differential area provided by lands 232 and 234. This tends to oppose the upshifting force of the 2-3 shift valve, but the pressure acting on that differential area is exhausted through passage 272 when the 2-3 shift valve 214 moves downward, thereby providing a snap action.

If the manual valve is shifted to the first speed ratio or manual low position, passage 162 is pressurized and control pressure is distributed across two-way check valve 274 which holds the 2-3 shift valve in the upward position thereby preventing a 2-3 upshift.

The 1-2 shift valve, when it is in the position shown in FIG. 2B, is subjected to a pressure force acting on the differential area of lands 172 and 174 tending to prevent a 1-2 upshift. This pressure is received from forward clutch pressure line 168. When the 1-2 shift valve moves downward, line pressure acting on the differential area of lands 172 and 174 is exhausted providing a snap action.

The 2-1 scheduling valve which is identified by reference character 278, includes valve lands 280 and 282 which define a differential area that is subjected to line pressure force from the pressure in passage 162 when the manual valve is in the manual low or reverse drive range positions. A third valve land 284 controls communication between passage 162 and passage 286, which leads to the reverse clutch. The pressure force acting on the differential area of lands 282 and 280 opposes the force of the valve spring 288.

The 2-1 schedule valve 278 provides a regulated pressure in passage 276 which prevents an early downshift to the low range position during coasting operation when the manual valve is in the manual-low drive range position. The 2-1 scheduling valve normally will increase the pressure that tends to downshift the 1-2 shift valve during coasting operation. This will prevent the 1-2 shift valve from downshifting at excessively high speeds in those instances when the vehicle operator momentarily advances the accelerator position. A transient or momentary increase in the throttle pressure will not effect a downshift to the low speed range because 2-1 scheduling valve is sensitive to line pressure acting on the differential area of lands 280 and 282 and compensates for an increase in control pressure by modulating a lower pressure in passage 276.

Reference character 290 designates a main oil pressure regulator valve. It has three valve lands 292, 294 and 296. Pressure is distributed to the main pressure regulator valve from line pressure passage 228 at a location intermediate lands 292 and 294. Feedback pressure is distributed from passage 228 to the upper end of land 296. Valve spring 298 provides a necessary pressure regulating spring force. Exhaust port 300 communicates with exhaust passage 302 leading to the transmission sump.

Land 292 regulates the degree of communication between passage 228 and converter charge pressure passage 304. Converter pressure relief valve 306 communicates with passage 304 to protect the converter against excessive pressure buildup in the event of a malfunction of the main oil pressure regulator. Included in the main oil pressure regulator valve assembly is the main oil pressure booster 308 which has three annular lands 310, 312 and 314 which are formed with successively smaller diameters. The lower side of land 314 is supplied with primary throttle pressure through passage 198 so that the effective line pressure in passage 146 is determined in part by the magnitude of the engine intake manifold pressure.

Passage 164, which is pressurized during reverse drive operation as the manual valve is shifted to the reverse position, communicates through passage 316 with the differential area provided by lands 312 and 314. This causes a line pressure boost during operation of the transmission in reverse drive operation thereby providing the added torque capacity required by the transmission clutch and brake servos. Primary throttle pressure is distributed also through cutback coast boost valve 318 to passage 320, which extends to the differential area provided by lands 310 and 312. If the transmission coasts at high speeds and the manual valve is in the manual low position or the intermediate speed ratio position, line pressure is distributed to the cutback coast boost valve 318 through passage 324. Passage 324 communicates with passage 160 through the two-way check valve 274 when the manual valve is in the second speed ratio position and it communicates through the check valve 274 with passage 162 when the manual valve is in the low speed ratio or manual low position. The pressure in passage 324 prevents a decrease in line pressure during coasting at high speeds under these conditions. The cutback coast boost valve responds to governor pressure which is distributed to it through passage 322. Line pressure as mentioned earlier is distributed to the cutback coast boost valve 318 through passage 324.

Throttle downshift valve 326 controls distribution of line pressure from front clutch pressure passage 168 to passage 328 which communicates with the lower end of the 2–3 shift valve thereby forcing a 3–2 downshift when the vehicle operator advances the engine throttle sufficiently to cause valve land 330 to uncover passage 168. At the same time downshift pressure is distributed through passage 224 to the differential area defined by lands 186 and 184 on the 1–2 shift valve thereby tending to force the 1–2 shift valve to the downshift position if the vehicle speed and the governor pressure is sufficiently low to allow the 1–2 shift valve to move upwardly.

The 2–3 backout shift valve controls the timing when the transmission is shifted from the intermediate ratio to the high speed ratio with a relaxed throttle. The 2–3 backout shift valve includes a pair of spaced valve lands 332 and 334, which normally provide communication between the intermediate servo apply passage 250 and passage 246. Movement of the valve 248 in a right-hand direction is against the opposing force of spring 338 and primary throttle valve pressure in passage 198. Communication between passages 340 and 250 occurs if the direct clutch pressure in passage 340 is sufficient to overcome the force of spring 338 and the force of primary throttle valve pressure acting on the right-hand side of valve land 332. Thus the displacement of fluid from the apply side of the intermediate servo is retarded and application of a relaxed throttle, backout direct-drive clutch during the 2–3 upshift is achieved.

The engagement and disengagement of the clutch for the converter, as explained previously, is controlled by controlling the direction of fluid-flow through the converter passages 138, 140 and 136. This control is achieved by the converter clutch control valve 340. This valve comprises multiple valve lands 342, 344, 346, 348 and 350. The valve is biased in an upward direction by valve spring 352. These register with cooperating internal valve lands. Valve 340 provides communication between the converter charge pressure passage 304 and passage 354 which communicates with converter feed passage 136 through the capacity modulator valve 356. This valve has a valve spool having three spaced valve lands 358, 360 and 362. When passage 354 is pressurized, spool valve 356 is held in an upward position thereby establishing direct communication between passage 354 and passage 136. Converter charge pressure is distributed also from passage 304 to passage 138 through the space between lands 348 and 350. Thus, the torus circuit of the converter is fed from two inlet passages 136 and 138. The return passage for the torus circuit is passage 140 which communicates with the transmission cooler and rear lubrication circuit through passage 365. When the valve 340 moves in a downward direction, passage 354 becomes exhausted through exhaust port 364 and converter charge pressure passage 304 is brought into communication with passage 364. At the same time line pressure passage 228 is brought into communication with passage 140 through the valve 340 as well as passage 138. The capacity modulator valve 356 under these conditions begins to modulate and to establish a controlled pressure in passage 136 which is determined by the value for spring 366 and by the differential area of lands 360 and 362. A change in clutch capacity thus is achieved in response to changes in engine manifold pressure because the magnitude of the line pressure that is established by the main oil pressure regulator valve is related to the magnitude of the primary throttle valve pressure. That variable line pressure acts on the differential area of lands 360 and 362 of the capacity modulator valve 366 thereby producing a controlled pressure in passage 136. The capacity of the clutch then can be determined by the characteristics of the valve 366 so that it is engaged with an engaging force that is necessary for any given operating torque.

When the converter clutch is unlocked, the converter clutch control valve 340 is in the upward position as indicated in FIG. 2A. It is held in that position by the force of spring 352 and by the force of line pressure acting on the lower end of the valve element which is distributed to the converter clutch control valve from passage 228. The presence of line pressure on the lower end of the converter clutch control valve makes certain that the valve will not move before the end point pressure for triggering a 2–3 upshift has been reached.

When the converter clutch control valve is in the clutch unlocked position, converter charge pressure is distributed from passage 304 through the converter clutch control valve to converter feed passage 138. Converter charge pressure is distributed also from passage 304 through the converter clutch control valve to the passage 354, which extends to the capacity modulator valve 356 and to the lower end of the L-3-2 distributor valve generally identified by reference character 367. Passage 354 communicates with passage 368 which establishes communication with valve 367.

Capacity modulator valve 356 establishes communication between passage 354 and passage 136 which extends to the clutch release chamber between the clutch element 116 and the housing wall 94. Converter charge pressure which is present in passage 354 at that time acts on the lower valve land 362 to complement the pressure force acting in an upward direction established by the presence of line pressure on the differential area of lands 360 and 362. That differential area communicates with line pressure passage 228 through passage 370. Passage 140 acts as a flow return passage which communicates with the transmission cooler and lubrication oil circuit through the converter clutch control valve and passage 365.

When the converter clutch control valve is in a downward position, which corresponds to the clutch locked condition, converter charge pressure in passage 304 is routed through the converter clutch control valve directly to passage 365 which extends to the cooler and lubrication oil circuits. Simultaneously, line pressure from passage 228 is routed through the converter clutch control valve to passage 140 and also to passage 138. Simultaneously, passage 354, which communicates with the lower end of the capacity modulator valve and with passage 368 is exhausted through exhaust port 364. The pressure distribution to the converter torus circuit thus is reversed and flow through the clutch release chamber between the clutch member 116 and the housing wall 194 is interrupted thereby causing the clutch to become engaged. A residual pressure remains in the clutch release chamber, however, because of the operation of the capacity modulator valve. That residual pressure is distributed to the capacity modulator valve through passage 136. Since the pressure force acting on the lower end of the valve land 362 no longer is present during a lockup condition, the capacity modulator valve begins to modulate the pressure in passage 136.

The converter clutch control valve is operated in response to pressure distribution to passage 372 by the 3-L shift valve generally identified by reference character 374. Valve 374 comprises valve lands 376, 378, 380 and 382. Valve lands 380 and 382 have a differential area that is subjected to line pressure when valve 374 is in the position shown in FIG. 2a. Line pressure is distributed to that differential area through branch passage 384 which communicates with line pressure passage 228. Signal passage 386 extends to the top land 342 of the converter clutch control valve 340. Pressure is distributed to the signal passage 386 from the 3-L shift valve through communicating passage 388. When the valve 374 is in the position shown, passage 388 is exhausted through exhaust port 400 in the 3-L shift valve 374. The top land 376 of the 3-L shift valve 374 is subjected to governor pressure which is distributed to it through governor passage 386. Governor pressure passage 190 communicates with passage 386 through passage 392. Valve springs 394 and 396 urge the 3-L shift valve in an upward direction.

The valve 374 will move downwardly to the upshift or lockup position as governor pressure acting on the upper end of land 376 increases sufficiently. When a shift occurs, the differential area defined by the lands 382 and 380 becomes exhausted through exhaust port 398 so that the movement of the valve 374 will occur with a snap action caused by the hysteresis effect. Passage 388, which is exhausted through exhaust port 400 when the valve 374 assumes the position shown in FIG. 2a, communicates with passage 402 when the valve 374 is moved in a downward direction. Passage 402 is pressurized following movement of the 2-3 shift valve to the upshift position which corresponds to direct-drive operation when the direct-drive clutch 62 is applied. This is achieved as passage 240 is brought into communication with passage 264 through the 2-3 shift valve.

Shifting movement of the 3-L shift valve controls operation of the clutch control valve. The 3-L shift valve in turn responds to changes in governor pressure and modulated throttle pressure received from 3-L modulator valve 218 through passage 416. This valve comprises a valve spool having differential diameter lands 404 and 406. The valve spool is urged toward the position shown in FIG. 2 by valve spring 408 and by the modulated throttle pressure acting on the differential area defined by lands 404 and 406. Throttle valve pressure from the throttle boost valve 200 is distributed to the upper side of land 404 through passage 410. That same pressure is distributed to the lower end of the throttle pressure modulator 212 through passage 412. The throttle pressure modulator 212 modulates the pressure in passage 412 and distributes the output pressure signal to the lower end of the land 238 of the 2-3 shift valve 214 through passage 188 thereby delaying 2-3 upshifts carrying acceleration. The throttle pressure from the throttle pressure booster valve 200 is modulated by valve 218 by reason of the differential area of lands 404 and 406 and by reason of the spring 408. Feedback pressure for valve 218 is distributed to the lower end of the land 406 through feedback pressure 412. The output pressure is distributed to the differential area on the 3-L shift valve defined by lands 376 and 378 thereby controlling the shift point for the 3-L shift valve.

Line pressure from the throttle downshift valve 326 is distributed through passage 328 to passage 414 to the 3-L modulator valve when the throttle downshift valve is actuated by the vehicle operator to produce a forced downshift. In these conditions line pressure is distributed directly across the valve 218 from passage 414 to passage 416 which extends to the 3-L shift valve. That same pressure during a forced downshift is distributed from passage 414 to passage 418 to the lower end of the 3-L shift valve 374 to cause the latter to assume the upward position shown in FIG. 2a. Passages 418 and 414 are exhausted through passage 328 when the transmission is not in a forced downshift condition and when the manual valve is in the automatic drive range position. When the manual valve is in the automatic drive range position, passage 328 is exhausted through the throttle downshift valve 226, through passage 420 and through passage 162.

The L-3-2 valve is adapted to distribute governor pressure from passage 190 to the passage 192 and hence to the upper lands of the 2-3 shift valve and the 1-2 shift valve whenever converter charge pressure is present in passage 368. The L-3-2 valve has spaced valve lands 422 and 424 which respectively control the ports leading to passages 190 and 230.

The L-3-2 valve presents automatic 3-2 downshifts while the converter is in a locked condition. It does this by routing line pressure from passage 230 to passage 192 thus forcing the 2-3 shift valve and the 1-2 shift valve in a downward direction as viewed in FIG. 2.

When the converter is unlocked the converter outflow pressure in passage 140 is less than the convertor charge pressure acting on the bottom of the L-3-2 valve because of the pressure drop that occurs as oil flows through the converter. Counter pressure then is distributed to each of the shift valves. When the converter is locked, passage 140 becomes subjected to line pressure and passage 368 becomes exhausted. This forces the L-3-2 valve downwardly thereby blocking governor pressure for the 1-2 shift valve and the 2-3 shift valve and substituting line pressure on the upper ends of lands 232 and 186.

The 3-L modulator valve, by reason of the differential area of lands 404 and 406, has a hysteresis feature which makes it necessary to have a higher throttle valve pressure to produce the necessary upwardly directed shifting force on the 3-L shift valve to disengage the lockup clutch than the corresponding throttle pressure that delays interruption to initiate a lockup condition in the first instance. The 3-1 modulator valve is moved downwardly under the influence of secondary throttle valve pressure acting on the upper end of land 404. As the differential area of lands 404 and 406 is pressurized by the pressure in passage 416 at that time, a greater secondary throttle pressure will be required to shift the 3-L modulator valve than when the differential area of lands 404 and 406 is not pressurized by any pressure in passage 416. It is this characteristic that causes the so-called hysteresis feature. Thus when the converter clutch is unlocked, the 3-L modulator valve may be actuated at a given secondary throttle pressure level. On the other hand if the 3-L shift valve is not in the unlocked position, more throttle valve pressure is required to shift the 3-L modulator valve to the downshift position to unlock the converter clutch than the throttle pressure that was present when the converter clutch assumed an unlocked condition.

Figure 6:
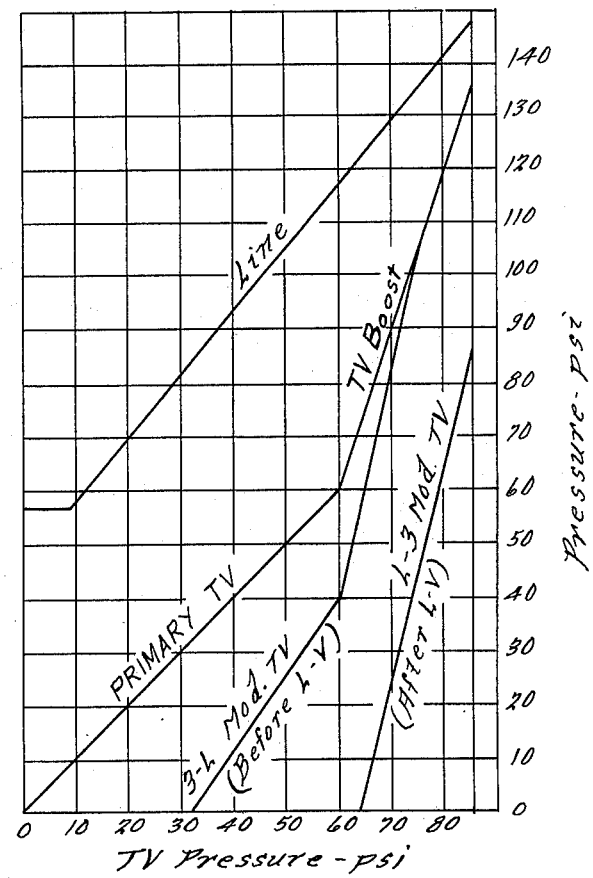
FIG. 6 is a chart showing the relationship between throttle pressure and output pressure for the 3-L modulator valve included in the circuit of FIGS. 2A and 2B.

FIG. 6 shows the relationship between the throttle pressure signal in passage 198 to the throttle pressure boost signal in passage 410, to the modulated throttle pressure signal on the output side of the 3-L modulator valve before a lockup condition occurs, and to the modulated throttle pressure signal on the output side of the 3-L modulator valve after a lockup condition occurs. Primary throttle valve pressure in passage 198 acts also on the main oil pressure regulator valve to produce a boosted line pressure as throttle pressure increases. This produces, as indicated in FIG. 6, a linear relationship between the line pressure in passage 228 to the primary throttle valve pressure in passage 198. The modulated throttle valve pressure curve in FIG. 6 for the lockup condition is different than the corresponding gear for the unlocked condition because the pressure acting on the differential area of lands 406 and 404 is either zero or full line pressure depending upon the position of the valve element 374.

Figure 5:
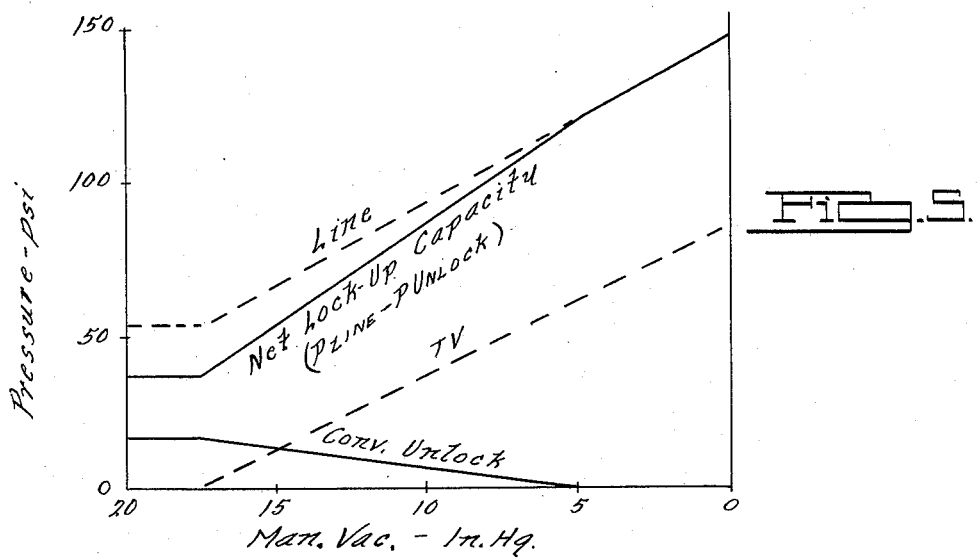
FIG. 5 is a chart showing the relationship between lock-up clutch pressure and manifold vacuum which is characteristic of the valve of FIG. 4.

FIG. 5 shows the relationship between the engine manifold vacuum and the lockup clutch actuating pressure. That pressure is the algerbraic sum of the line pressure and the opposing pressure of the release side of the clutch member 116. The magnitude of the latter being determined by the lockup capacity modulator valve shown in FIG. 4. The FIG. 4 view is the same as the view of the capacity modulator valve in FIG. 2 although it is shown enlarged.

Having thus described the preferred embodiment of our invention, what we claim and desire to secure by United States Letters Patent is:

1. A hydrokinetic power transmission mechanism having a hydrokinetic unit with an impeller and a turbine, the impeller being connected driveably to an engine, multiple ratio gearing, an output gear element of said gearing being connected to a driven member, clutch and brake means for controlling the relative motion of gear elements of said gearing to establish multiple speed ratios therein, said hydrokinetic unit comprising a housing connected to said impeller and a turbine in said housing arranged in toroidal fluid flow relationship with respect to said impeller and adapted to be connected to an input element of said gearing, lockup clutch means in said housing for connecting driveably said turbine to said housing thereby establishing a direct-driving connection between said turbine and said engine, a source of control pressure, control circuit means for establishing fluid distribution from said control pressure source to said clutch and brake means, said control circuit means including a pressure regulator valve adapted to establish a hydrokinetic unit charge pressure in a first portion of said control circuit means and clutch-and-brake means actuating pressure in another portion of said control circuit means, said lockup clutch means comprising a pressure actuated friction member cooperating with said housing to define a pressure zone containing pressure that develops a force opposing application of said lockup clutch means, said friction member being exposed to the charge pressure in said hydrokinetic unit whereby clutch actuating forces are applied to said clutch member, said pressure zone being in fluid communication with said first portion of said control circuit means, the hydrokinetic unit being in fluid communication with said first portion of said control circuit means, a flow return passage communicating with said hydrokinetic unit and extending to low fluid pressure regions, and hydrokinetic unit lockup clutch valve means in both of said portions of said control circuit means for supplying pressure directly from said other portion to said hydrokinetic unit and for modulating the pressure in said pressure zone to effect a pressure unbalance across said friction member causing the lockup clutch means to be engaged.

2. The combination set forth in claim 1 wherein said control circuit means comprises a capacity modulator valve means in fluid communication with said pressure zone for establishing a calibrated pressure therein, said clutch valve means being in fluid communication with said capacity modulator valve means whereby control pressure is distributed from the former to the latter and the latter senses a change in said control pressure to a first valve when the former assumes a clutch disengaged position to render said capacity modulator valve means inactive and establish communication between said first portion of said circuit means and said pressure zone, a change in said control pressure to a second valve being sensed by said capacity modulator valve means to render it active when said clutch control valve assumes a clutch engaged position.

3. The combination set forth in claim 2 wherein said clutch valve means comprising a first clutch control element and a second clutch control element, the latter being subjected to said speed signal and to said torque signal, means normally urging said first clutch control element to a clutch unlocked position, said first clutch control element being in fluid communication with said second clutch control element whereby an actuator signal is distributed from the latter to the former upon an increase in the ratio of the speed signal to the torque signal whereby said first clutch control element is urged to a clutch locked position.

4. The combination set forth in claim 3 wherein said control circuit means further includes a throttle pressure modulator valve means disposed between said second clutch control element and said torque signal source for modifying the torque signal distributed to said second clutch control element whereby the shift timing for engagement and disengagement of said clutch member may be controlled.

5. The combination set forth in claim 1 wherein said clutch valve means comprises a first clutch control element and a second clutch control element, the latter being subjected to said speed signal and to said torque signal, means normally urging said first clutch control element to a clutch unlocked position, said first clutch control element being in fluid communication with said second clutch control element whereby an actuator signal is distributed from the latter to the former upon an increase in the ratio of the speed signal to the torque signal whereby said first clutch control element is urged to a clutch locked position.

6. The combination set forth in claim 5 wherein said control circuit means further includes a throttle pressure modulator valve means disposed between said second clutch control element and said torque signal source for modifying the torque signal distributed to said second clutch control element whereby the shift timing for engagement and disengagement of said clutch member may be controlled.

7. A hydrokinetic power transmission mechanism having a hydrokinetic unit with an impeller and a turbine, the impeller being connected driveably to an engine, multiple ratio gearing, an output gear element of said gearing being connected to a driven member, clutch and brake means for controlling the relative motion of gear elements of said gearing to establish multiple speed ratios therein, said hydrokinetic unit comprising a housing connected to said impeller and a turbine in said housing arranged in toroidal fluid flow relationship with respect to said impeller and adapted to be connected to an input element of said gearing, lockup clutch means in said housing for connecting driveably said turbine to said housing thereby establishing a direct-driving connection between said turbine and said engine, a source of control pressure, control circuit means for establishing fluid distribution from said control pressure source to said clutch and brake means, said control circuit means including a pressure regulator valve adapted to establish a hydrokinetic unit charge pressure in a first portion of said control circuit means and clutch-and-brake means actuating pressure in another portion of said control circuit means, said lockup clutch means comprising a pressure actuated friction member cooperating with said housing to define a pressure zone containing pressure that develops a force opposing application of said lockup clutch means, said friction member being exposed to the charge pressure in said hydrokinetic unit whereby clutch actuating forces are applied to said clutch member, said pressure zone being in fluid communication with said first portion of said control circuit means, the hydrokinetic unit being in fluid communication with said first portion of said control circuit means, a flow return passage communicating with said hydrokinetic unit and extending to low fluid pressure regions, hydrokinetic unit lockup clutch valve means in both of said portions of said control circuit means for supplying pressure directly from said other portion to said hydrokinetic unit and for modulating the pressure in said pressure zone to effect a pressure unbalance across said friction member causing the latter to be engaged, an engine torque signal valve means for establishing a pressure signal that is related in magnitude to engine torque, a speed signal source for developing a speed pressure signal related in magnitude to the driven speed of said driven member, said speed signal acting on said lockup clutch valve means for triggering movement thereof to a clutch engaged position upon an increase in the ratio of the speed signal pressure signal to the torque signal pressure signal, said pressure regulator valve being in fluid communication with said torque signal valve means whereby auxiliary pressure forces act on said pressure regulator valve means to increase the output regulated pressure level thereof upon an increase in engine torque, said capacity modulator valve communicating with the pressure outlet side of said pressure regulator valve to cause a clutch capacity increase for said clutch member upon an increase in engine torque.

8. The combination set forth in claim 7 wherein said clutch valve means comprising a first clutch control element and a second clutch control element, the latter being subjected to said speed signal and to said torque signal, means normally urging said first clutch control element to a clutch unlocked position, said first clutch control element being in fluid communication with said second clutch control element whereby an actuator signal is distributed from the latter to the former upon an increase in the ratio of the speed signal to the torque signal whereby said first clutch control element is urged to a clutch locked position.

9. The combination set forth in claim 6 wherein said control circuit means further includes a throttle pressure modulator valve means disposed between said second clutch control element and said torque signal source for modifying the torque signal distributed to said second clutch control element whereby the shift timing for engagement and disengagement of said clutch member may be controlled.

10. A hydrokinetic transmission having a hydrokinetic unit with an impeller and a turbine situated in toroidal fluid flow relationship, a housing surrounding said turbine and said impeller which is connected mechanically to said impeller and to said engine, multiple ratio gearing, a driven member connected to output elements of said gearing, input elements of said gearing being connected to said turbine, a pressure actuated clutch member disposed between said housing and said turbine and defining on one side thereof a clutch release pressure zone, the other side of said clutch member being exposed to circuit pressure within said hydrokinetic circuit, first passage means for providing converter fluid to said hydrokinetic unit, second passage means for providing hydrokinetic fluid to said unit through said clutch release pressure, a third passage means communicating with said hydrokinetic unit, a pressure source, a control valve circuit having a high pressure region and a low pressure region, pressure regulator valve means communicating with said pressure source in said circuit for regulating the pressure in said separate regions, clutch control valve means for establishing communication between said third passage and an exhaust region when said control valve means assumes a clutch unlocked position and for establishing communication between said low pressure region and said first and second passages when said control valve means is in a clutch unlocked position, said control valve means being adapted to assume a second position whereby communication is established between said first and third passages and said high pressure region when said clutch control valve means assumes a clutch locked position, and a capacity modulator valve means in said second passage for regulating the magnitude of the pressure in said clutch release pressure zone when said clutch control valve means assumes its clutch locked position.

11. A hydrokinetic transmission having a hydrokinetic unit with an impeller and a turbine situated in toroidal fluid flow relationship, a housing surrounding said turbine and said impeller which is connected mechanically to said impeller and to said engine, multiple speed ratio gearing, a driven member connected to output elements of said gearing, input elements of said gearing being connected to said turbine, clutch and brake means for controlling operation of said gearing to establish various speed ratios, a pressure actuated clutch member disposed between said housing and said turbine and defining on one side thereof a clutch release pressure zone, the other side of said clutch member being exposed to circuit pressure within said hydrokinetic circuit, first passage means for providing converter fluid to said hydrokinetic unit, second passage means for providing hydrokinetic fluid to said unit through said clutch release pressure zone, a third passage means communicating with said hydrokinetic unit, a pressure source, a control valve circuit having a high pressure region and a low pressure region adapted to control pressure distribution from said high pressure region to said clutch and brake means, pressure regulator valve means communicating with said pressure source in said circuit for regulating the pressure in said separate regions, clutch control valve means for establishing communication between said third passage and an exhaust region when said control valve means assumes a clutch unlocked first position and for establishing communication between said low pressure region and said first and second passages when said control valve means is in a clutch unlocked position, said control valve means being adapted to assume a second position whereby communication is established between said first and third passage means and said high pressure region when said clutch control valve means assumes a clutch locked position, a capacity modulator valve means in said second passage means for regulating the magnitude of the pressure in said clutch release pressure zone when said clutch control valve means assumes its clutch locked position, a shift valve forming a part of said high pressure region in fluid communication with said clutch control valve means whereby a clutch control valve means actuating pressure is distributed thereto and exhausted therefrom upon shifting movement of said shift valve from one position to another, a source of an engine torque signal, and a source of a driven member speed signal, said shift valve being adapted to respond to changes in said signals whereby it is actuated to a clutch engaging position upon an increase in the ratio of said speed signal to said torque signal.

12. The combination set forth in claim 11 wherein said control valve circuit means includes further a torque signal modulator valve means disposed between said shift valve and said torque signal source for modifying the magnitude of the torque signal effective on said shift valve thereby controlling the timing of the clutch engagement.

13. The combination as set forth in claim 11 wherein said control valve circuit includes further a shift inhibitor valve means for preventing downshifting of said clutch and brake means when said shift valve is in a clutch engaged position.

14. The combination as set forth in claim 12 wherein said control valve circuit includes further a shift inhibitor valve means for preventing downshifting of said clutch and brake means when said shift valve is in a clutch engaged position.

* * * * *